United States Patent
Dang

(10) Patent No.: US 10,505,423 B2
(45) Date of Patent: Dec. 10, 2019

(54) NESTED THREE PHASE BUS BAR UNIT

(71) Applicant: Faraday & Future Inc., Gardena, CA (US)

(72) Inventor: Dang Dinh Dang, Garden Grove, CA (US)

(73) Assignee: FARADAY & FUTURE INC., Gardena, CA (US)

(*) Notice: Subject to any disclaimer, the term of this patent is extended or adjusted under 35 U.S.C. 154(b) by 225 days.

(21) Appl. No.: 15/281,881

(22) Filed: Sep. 30, 2016

(65) Prior Publication Data

US 2018/0097416 A1  Apr. 5, 2018

(51) Int. Cl.
  *H02K 3/50*  (2006.01)
  *H02K 3/28*  (2006.01)
  *H02K 3/12*  (2006.01)

(52) U.S. Cl.
  CPC ............ *H02K 3/28* (2013.01); *H02K 3/12* (2013.01); *H02K 3/50* (2013.01); *H02K 2203/09* (2013.01)

(58) Field of Classification Search
  CPC .................. H02K 3/50; H02K 2203/09
  See application file for complete search history.

(56) References Cited

U.S. PATENT DOCUMENTS

2015/0188376 A1* 7/2015 Yamaguchi .......... H02K 3/522
                                                            310/71
2015/0357888 A1* 12/2015 Houzumi ............ H02K 15/12
                                                            174/110 R

* cited by examiner

*Primary Examiner* — Ramon M Barrera
(74) *Attorney, Agent, or Firm* — Knobbe Martens Olson & Bear LLP

(57) ABSTRACT

Certain aspects relate to a bus bar unit for providing three phases of electric current to the windings of the stator of an electric machine while structured to have a compact footprint for fitting within the enclosure of the electric machine. Each winding can have a phase lead end and a neutral end extending above one face of the stator. The bus bar unit can include three phase lead bus bars and a neutral bus bar each having a planar branch with legs extending from the planar branch, each leg having a slot at an end thereof for electrically coupling with either the phase lead or the neutral end of one or more of the windings. The planar branches can be stacked such that they overlap from a top-down perspective but are spaced apart from a side perspective.

9 Claims, 15 Drawing Sheets

NESTED THREE PHASE BUS BAR UNIT

TECHNICAL FIELD

The systems and methods disclosed herein are directed to bus bars, and, more particularly, to three phase bus bars in a nested, compact arrangement.

BACKGROUND

In recent years, high efficiency electric motors have become desirable to meet the challenges of providing power without the usage of fossil fuel sources, for example in hybrid and electric vehicles. In efforts to increase efficiency and power output of motors for a given volume and weight, packaging problems arise involving electric current distribution to the motor windings.

SUMMARY

The bus bar configurations disclosed herein have several features, no single one of which is solely responsible for its desirable attributes. Without limiting the scope as expressed by the claims that follow, the more prominent features of the design will now be discussed briefly. After considering this discussion, and particularly after reading the section entitled "Detailed Description" one will understand how the features of the rotor designs provide several advantages over traditional systems and methods.

One aspect relates to a three-phase electric machine comprising a stator having a plurality of teeth separated by a plurality of slots; a plurality of windings provided in a winding pattern in the plurality of slots, each of the plurality of windings having a phase lead end and a neutral end extending beyond an end face of the stator; and a bus bar unit positioned adjacent to the end face of the stator to receive the phase lead end and the neutral end of each of the plurality of windings, the bus bar unit comprising first, second, and third phase lead bus bars, wherein each of the first, second, and third phase lead bus bars comprises a planar branch, at least a first leg extending from the planar branch, the first leg having a first phase lead slot sized to receive the phase lead end of at least one of the plurality of windings, and a connection terminal extending from the planar branch for receiving one of three phases of electric current; and an enclosure enclosing the stator, the plurality of windings, and the branches and legs of the bus bar unit.

In some embodiments, the bus bar unit further comprises a neutral bus bar, the neutral bus bar comprising at least a first planar branch, and at least three legs extending from the first planar branch, each of the at least three legs having a first neutral slot sized to receive the neutral end of at least one of the plurality of windings. In some embodiments, the first, second, and third phase lead bus bars are positioned in a stack such that from a top-down perspective orthogonal to the end face of the stator, the planar branches of each of the first, second, and third phase lead bus bars overlap at least partially with one another; and from a side perspective orthogonal to the top-down perspective, the planar branches of each of the first, second, and third phase lead bus bars are spaced apart from one another.

Each of the plurality of windings can be a continuous winding comprising a plurality of leg portions each positioned in one of the plurality of slots of the stator and a plurality of crowns connecting successive leg portions of the plurality of leg portions, where the crowns extend above the end face of the stator. The bus bar unit can be positioned between a peak of each of the plurality of crowns and an inner surface of the enclosure.

In some embodiments, the connection terminal of each of the first, second, and third phase lead bus bars is mechanically coupled to the enclosure.

In some embodiments, each of the first, second, and third phase lead bus bars comprises a second leg extending from the planar branch, the second leg having a first phase lead slot sized to receive the phase lead end of at least one of the plurality of windings, and the neutral bus bar comprises a second planar branch and at least three additional legs extending from the second planar branch, each of the at least three additional legs having a second neutral slot sized to receive the neutral end of at least one of the plurality of windings. The first phase lead slots of each of the first, second, and third phase lead bus bars and the first neutral slots of the neutral bus bar can be positioned along an inner circumference of the stator, and the second phase lead slots of each of the first, second, and third phase lead bus bars and the second neutral slots of the neutral bus bar can be positioned along an outer circumference of the stator. The inner and outer circumferences can be concentric with one another with the inner circumference having a smaller diameter than the outer circumference.

In some embodiments, the phase lead ends of a first subset of the plurality of windings are electrically coupled to the respective first phase lead slots to receive respective phases of the three phases of electric current, and wherein the phase lead ends of a second subset of the plurality of windings are electrically coupled to the respective second phase lead slots to receive respective phases of the three phases of electric current. First and second neutral slots of neutral bus bar can electrically couple the neutral ends of the plurality of windings with one another.

In some embodiments, the winding pattern includes a plurality of layers in each of the plurality of slots with an inner layer positioned adjacent an inner diameter of the stator and an outer layer positioned adjacent a backiron of the stator; the phase lead end of each a first subset of the plurality of windings extends above the end face of the stator from the inner layer; the neutral end of each of the first subset of the plurality of windings extends above the end face of the stator from the outer layer; the phase lead end of each a second subset of the plurality of windings extends above the end face of the stator from the outer layer; and the neutral end of each of the first subset of the plurality of windings extends above the end face of the stator from the inner layer. The first phase lead slot of each of the first, second, and third phase lead bus bars can be positioned to receive the phase lead end of at least one of the first subset of the plurality of windings. The first neutral slot of each of the at least three legs of the neutral bus bar can be positioned to receive the neutral end of at least one of the second subset of the plurality of windings. The second phase lead slot of each of the first, second, and third phase lead bus bars can be positioned to receive the phase lead end of at least one of the second subset of the plurality of windings. The second neutral slot of each of the at least three additional legs of the neutral bus bar can be positioned to receive the neutral end of at least one of the first subset of the plurality of windings.

Another aspect relates to a bus bar unit comprising first, second, and third phase lead bus bars, wherein each of the first, second, and third phase lead bus bars comprises a planar branch, first and second legs extending from separated portions of the planar branch, the first and second legs having respective phase lead slots sized to receive a phase lead end of at least one of a plurality of windings, and a connection terminal extending from each planar branch for receiving one of three phases of electric current; and wherein the first, second, and third phase lead bus bars and the neutral bus bar are positioned in a stack with substantially parallel planar branches such that from a top-down perspective the planar branches of each of the first, second, and third phase lead bus bars overlap at least partially with one another; and from a side perspective orthogonal to the top-down perspective, the planar branches of each of the first, second, and third phase lead bus bars are spaced apart from one another.

Some embodiments can additionally comprise a neutral bus bar, the neutral bus bar comprising at least a first planar branch; and at least three legs extending from the first planar branch, each of the at least three legs having a first neutral slot sized to receive the neutral end of at least one of the plurality of windings.

Another aspect relates to a method of making a three-phase electric machine comprising placing a plurality of windings in slots of a stator; coupling the windings to a stacked set of bus bars, wherein the coupling comprises coupling first ends of a first subset of the plurality of windings to a first portion of a first bus bar; coupling first ends of a second subset of the plurality of windings to a second portion of the first bus bar; coupling first ends of a third subset of the plurality of windings to a first portion of a second bus bar; coupling first ends of a fourth subset of the plurality of windings to a second portion of the second bus bar; coupling first ends of a fifth subset of the plurality of the windings to a first portion of a third bus bar; coupling first ends of a sixth subset of the plurality of the windings to a second portion of the third bus bar; and enclosing the stacked set of bus bars with the stator in a common enclosure.

In some embodiments, the method further comprises coupling second ends of the first subset of the plurality of windings to a first portion of a fourth bus bar; coupling second ends of the second subset of the plurality of windings to a second portion of the fourth bus bar; coupling second ends of the third subset of the plurality of windings to a third portion of the fourth bus bar; coupling second ends of the fourth subset of the plurality of windings to a fourth portion of the fourth bus bar; coupling second ends of the fifth subset of the plurality of windings to a fifth portion of the fourth bus bar; and coupling second ends of the sixth subset of the plurality of windings to a sixth portion of the fourth bus bar. Placing the plurality of windings in the slots of the stator can comprise forming an inner layer and an outer later in each of the slots, the inner layer positioned along an inner circumference and the outer layer positioned along an outer circumference, wherein the inner circumference is concentric with the outer circumference. The method can further comprise positioning the first portions of the first, second, and third bus bars above the inner circumference and positioning the second portions of the first, second, and third bus bars above the outer circumference. The method can further comprise positioning the first, third, and fifth portions of the fourth bus bar above the outer circumference and positioning the second, fourth, and sixth portions of the fourth bus bar above the inner circumference.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1A:
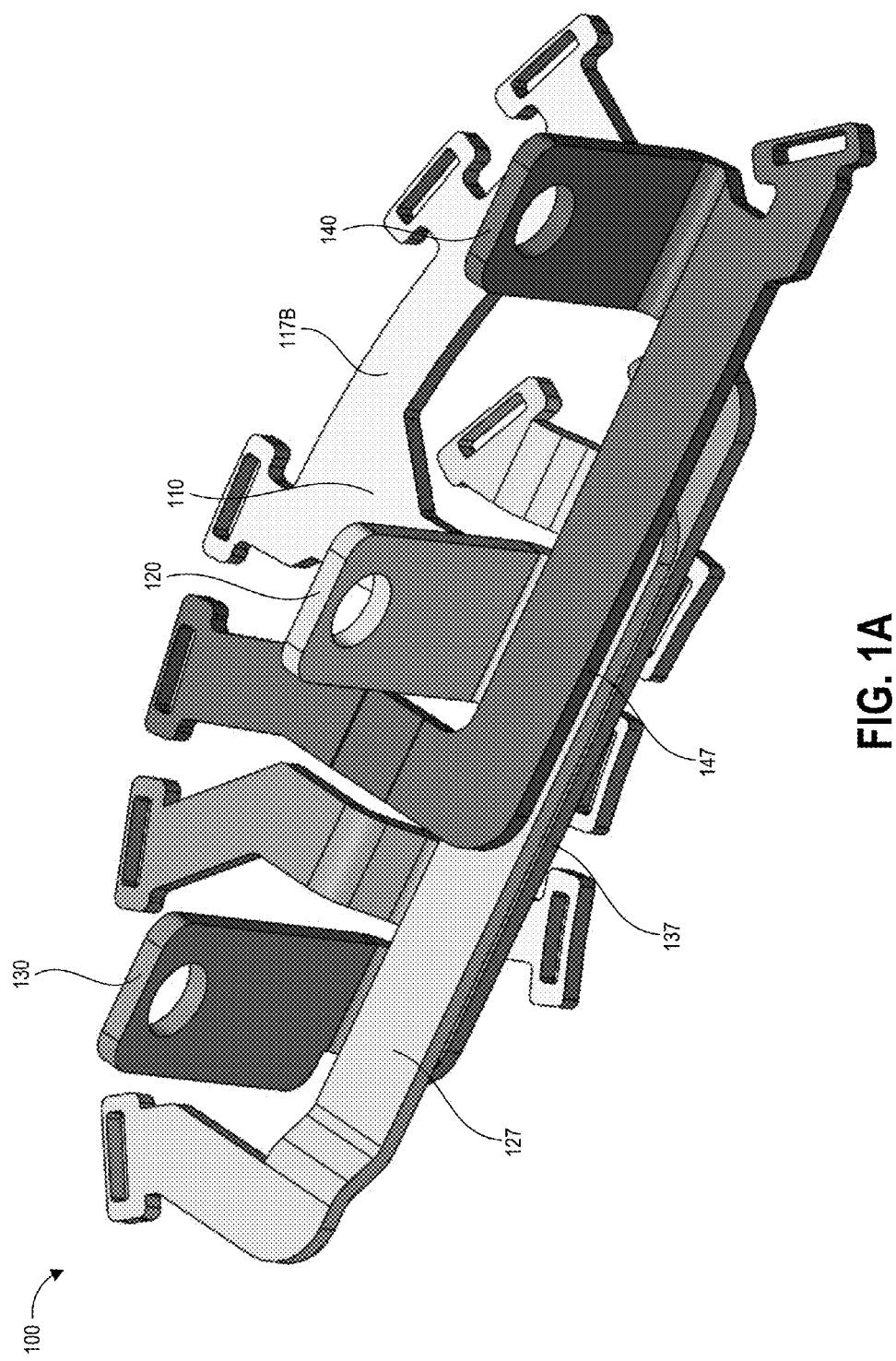
FIGS. 1A and 1B illustrate various perspective views of an example nested bus bar arrangement.

Embodiments of the disclosure relate to a nested three-phase bus bar unit for providing three phases of electric current and a neutral bus bar within a compact arrangement that can fit within the enclosure of an electric machine (for example, an electric motor or generator). The bus bar unit carries all three phases, provides the neutral bus bar, and keeps the phases properly isolated from each other, from the neutral bus bar, and from the electric machine components.

The disclosed bus bar and its variations can be used with any suitable electric motor or generator. The disclosed embodiments will be described primarily in the context of the electric motor, however the disclosed concepts can also be applied to an electric generator. Further, in addition to use in electric machines, a bus bar unit structured as disclosed herein can be used for other multi-phase electrical applications that require a compact bus bar structure. A bus bar unit can supply current from a power supply to the conductive windings of an electric motor. A bus bar unit can be an assembly or collection of conductors for collecting electric currents and distributing them to a number of other conductors.

One example of an electric motor includes a stator having a number of conductive windings wound through the stator to produce a rotating magnetic field in the frame of reference of the stator, a rotor rotatable within the stator, and an enclosure containing the windings, stator, and rotor. The rotor can have one or more permanent magnets embedded within it in some examples and thus the motor can be an interior permanent magnet motor. The stator can be of generally cylindrical form having first and second end faces, an inner diameter and an outer diameter, a backiron extending from the outer diameter to the base of a number of teeth, and the number of teeth extending from the backiron to the inner diameter. The teeth can be separated by a number of slots and the conductive windings can be positioned within the slots. In some embodiments of the electric motor, the windings can be continuous windings inserted into the stator slots in a predetermined winding configuration such that each winding has a phase lead (input) end and a neutral (output) end extending above one of the end faces of the stator. In the disclosed embodiments, all of the phase lead ends and all phase neutral ends can extend above the same end face of the stator. A continuous winding can include a number of generally straight leg portions for positioning within (for example via radial insertion) the stator slots and a number of crowns formed in the winding connecting successive leg portions. The crowns can include a bend or a compound bend at an apex of the crown and successive crowns in a winding can extend alternately above the first and second end faces of the stator. In some embodiments, the adjacent winding crowns can nest with one another to form a circular row of a compact winding arrangement above the first and second end faces of the stator. In one example three-phase motor, the winding pattern can include 18 conductors fed in parallel with six conductors per each of the three phases.

The bus bar unit can include three phase lead bus bars and a neutral bus bar. Each phase lead bus bar can have a planar branch with two legs extending from the planar branch, with each leg having a slot at an end thereof for electrically coupling with the phase lead end of one or more of the windings. The two legs can extend in different directions from one another such that the first phase lead slot of a phase lead bus bar is positioned above a winding layer along the inner diameter of the stator and the second phase lead slot of the phase lead bus bar is positioned above the outer layer of the stator slot adjacent to the stator backiron. The neutral phase lead bus bar can have first and second planar branches connected via a bridge, with a first set of three legs extending from the first planar branch and a second set of three legs extending from the second planar branch. Each leg can have a slot at an end thereof for electrically coupling with the neutral end of one or more of the windings. The first and second sets of legs can extend in different directions from one another such that the neutral slots of the first set of legs are positioned above a winding layer along the inner diameter of the stator and the neutral slots of the second set of legs are positioned above the outer layer of the stator slot adjacent to the stator backiron. The legs of the various bus bars can be connected to a planar branch via a bridge that can include a bend or compound bend, such that the leg extends at an angle and/or lies within a different plane than the planar branch. In the example three-phase motor having 18 conductors fed in parallel with six conductors per each of the three phases, each phase lead and neutral slot can be sized to fit the end of three of the winding conductors. The slots of the bus bars can be welded to the stator windings.

The planar branches can be stacked in a nested configuration such that they overlap from a top-down perspective orthogonal to the face of the stator but are spaced apart from a side perspective orthogonal to the top-down perspective. The bus bars can be spaced apart to provide both electrical and thermal insulation from one another. The bus bars can be provided with an insulating coating, for example a dielectric material. In some embodiments a coolant, for example oil, can be provided in the space between the bus bars when the motor is in use to provide cooling.

The phase lead bus bars and the neutral bus bar can be positioned within the enclosure of the electric motor between the apexes of the crowns of the windings and an interior surface of the enclosure. Each of the phase lead bus bars can have a connection terminal extending from the planar branch, for example extending perpendicularly from the plane of the planar branch. The connection terminal can be mechanically coupled to the enclosure or to a bus housing that is coupled to the enclosure. By having a single connection point to the enclosure or bus housing, a phase lead bus bar can accommodate motion due to thermal expansion resulting from heating during use. The nested configuration of the phase lead and neutral bus bars allows them to move together during thermal expansion.

For the phase lead bus bars, having the three-point support from the connection terminal and the two legs coupled to winding ends provides a mechanically stable support to maintain the positioning of these bus bars spaced apart from one another. Further, the dual-leg structure keeps resistance lower by only sauntering half of the conductors per phase together in comparison to sauntering all conductors together. The six-point support of the neutral bus bar by the six slots coupled to the windings provides a mechanically stable support to maintain the positioning of the neutral bus bar spaced apart from an adjacent phase lead bus bar and the motor components. By having at least one leg of each bus bar positioned above each of the inner and outer layers of the stator windings, the bus bars have increased mechanical stability compared to a bus bar having only a single connection point. In some embodiments, electrically non-conductive spacing pads can be provided between adjacent planar portions of the bus bars in the stack in order to prevent contact during jarring or motion of the electric motor.

The positioning of the various slots of the bus bar unit can reduce errors during insertion of the windings into their respective slots. For example, the size of each slot can fit a specific number of conductors corresponding to a set of conductors in each phase, and the positioning of the slots of the phase lead and neutral bus bars can be pre-selected to correspond to the locations of the windings that require electrical coupling with the respective bus bars. As such, when the conductors are being inserted, the technician can insert an end of first winding into a first slot and continue inserting ends of windings into the slot until it is full. The technician can insert the end of a next winding into the next slot and continue inserting ends of windings into the next slot until it is full, and so on until all windings have been inserted into the slots. This can be done for both the inner and outer diameters. When all windings have been inserted into the slots the ends of the windings and the terminals of the bus bars having the slots can be welded together.

The branches, legs, slots, and bridges of the phase lead and neutral bus bars can be integrally formed, in some embodiments, from a planar sheet of electrically conductive material, for example copper, brass or aluminum. The material of the planar sheet can be punched or cut to have a desired profile corresponding to the shape of a phase lead or neutral bus bar. The material can then be bent into the desired three-dimensional structure via the application of pressure, for example by pressing a forming tool against the material or by the bus bar material being pressed in a mold.

Though discussed primarily in the context of three phase lead bus bars and one neutral bus bar, it will be appreciated that the number of phase lead bus bars can be modified to accommodate the number of phases of electric currents in various designs to have two, four, or more bus bars. Further, the terminal and slot positioning of the examples herein are provided to illustrate one example of the described bus bars. In other examples all slots can be positioned over a single stator slot layer or over three or more stator slot layers, or a slot can extend across a number of layers of a single or multiple stator slots, depending on the locations of the phase lead ends and neutral ends of the windings in the winding design of a particular stator. In variations on the disclosed design, a slot can be sized to fit greater or fewer than three windings.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Bus Bar Unit

Figure 1B:
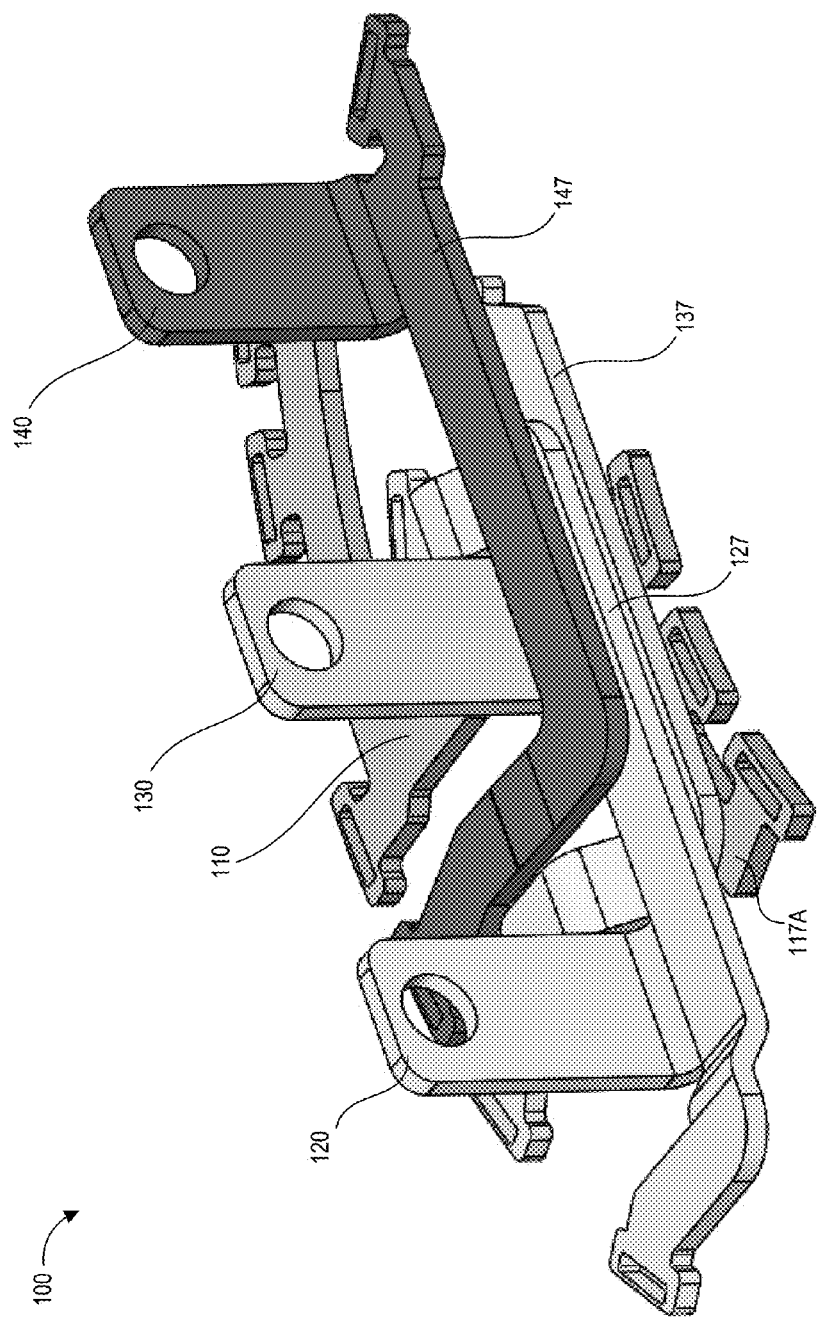
Figure 1C:
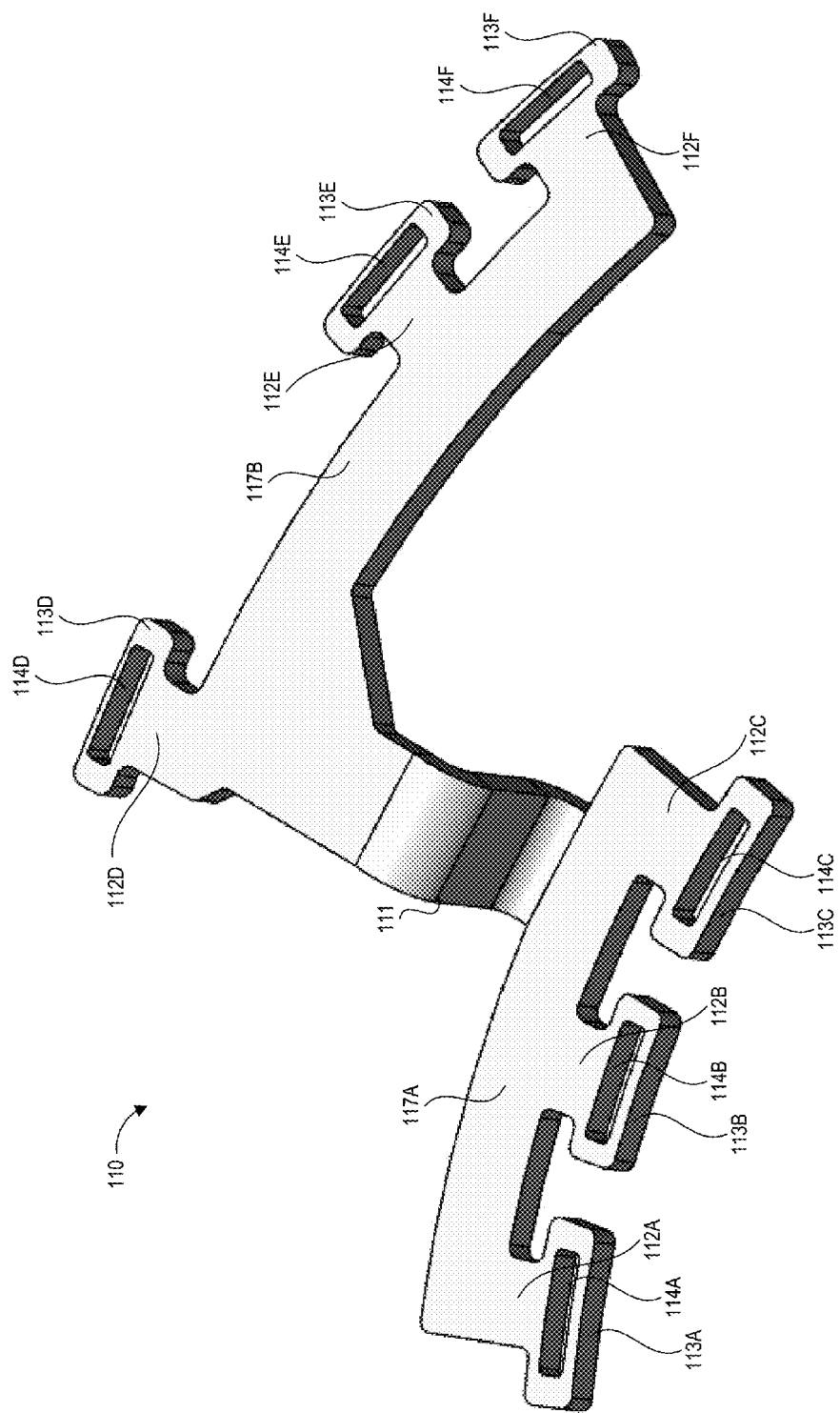
FIG. 1C illustrates the neutral bus bar of the example nested bus bar arrangement of FIGS. 1A-1B.
Figure 1D:
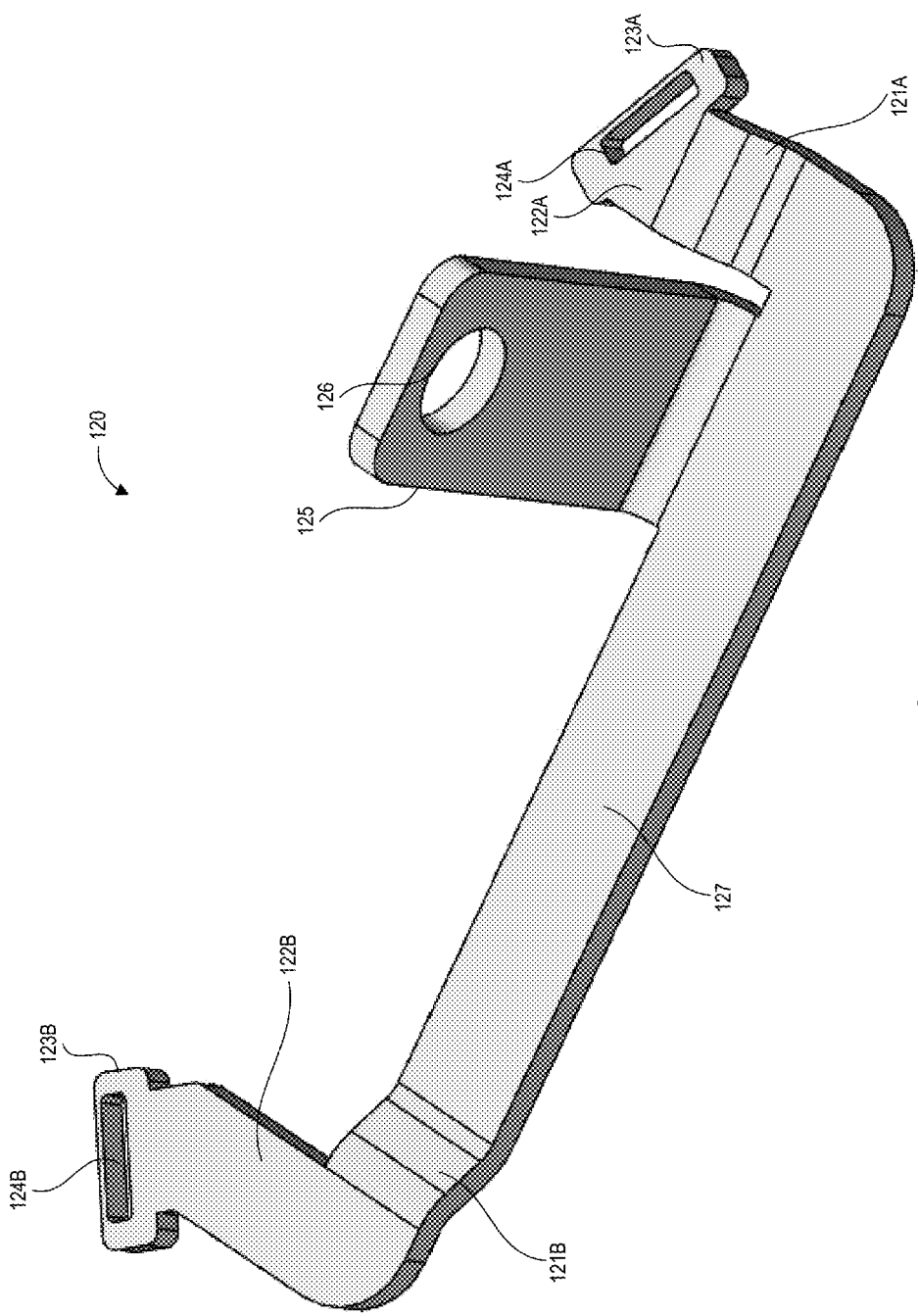
FIGS. 1D-1F each illustrate one of the three phase bus bars of the example nested bus bar arrangement of FIGS. 1A-1B.
Figure 1E:
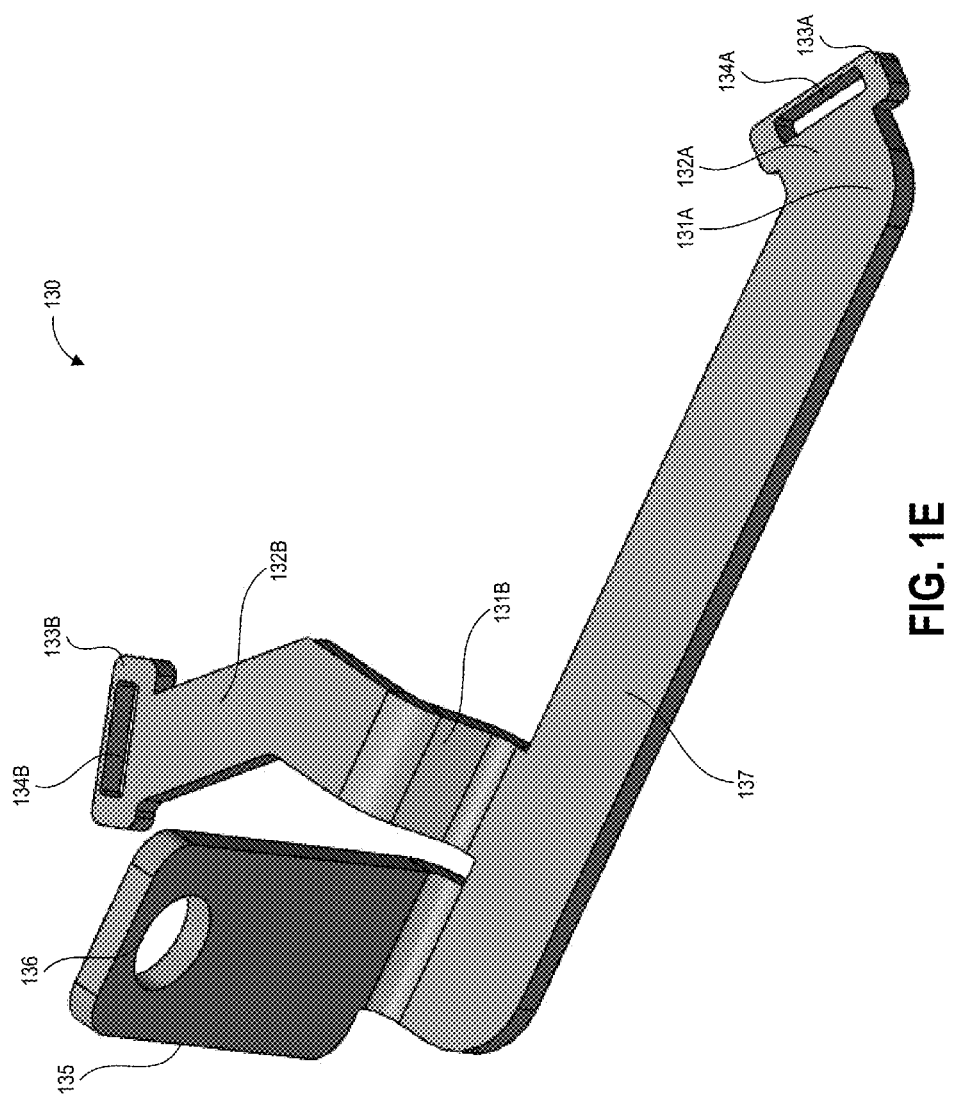
Figure 1F:
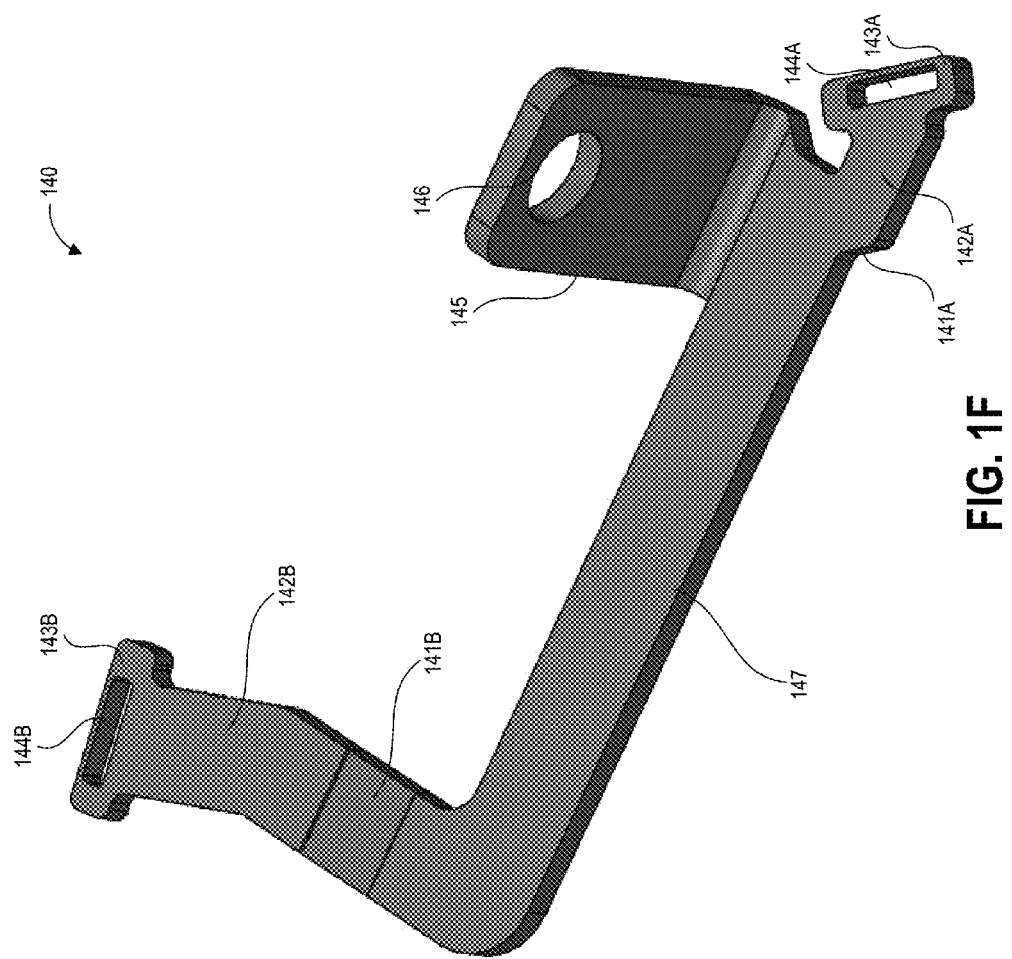

FIGS. 1A and 1B illustrate various perspective views of an example nested bus bar arrangement 100. The bus bar unit can include first, second, and third phase lead bus bars 120, 130, 140 and a neutral bus bar 110. FIG. 1C illustrates the neutral bus bar 110 of the example nested bus bar arrangement 100 of FIGS. 1A-1B. FIGS. 1D-1F each illustrate one of the three phase bus bars 120, 130, 140 of the example nested bus bar arrangement 100 of FIGS. 1A-1B. Although a particular configuration of the neutral bus bar is shown in FIG. 1C for electrically coupling all phase neutral ends of the winding conductors, it will be appreciated that the phase bus bars 120, 130, 140 of FIGS. 1D-1F can be used in alternate embodiments with different neutral bus bar configurations, for example a number of different neutral bus bars for electrically coupling phase neutral ends of designated subsets of the winding conductors.

The neutral phase lead bus bar 110 can have a first planar branch 112A and second planar branch 112B connected via a bridge 111. As illustrated, the first and second planar branches 112A, 112B can have substantially flat upper and lower faces and curved side faces. In other embodiments the first and second planar branches 112A, 112B can be straight. The first and second planar branches 112A, 112B can lie in different planes and connected by a curved bridge 111. A first set of three legs 112A, 112B, 112C can extend from the first planar branch 117A and a second set of three legs 112D, 112E, 112F can extend from the second planar branch 117B. Each leg 112A-112F can have a neutral slot 114A-114F at a neutral terminal end 113A-113F thereof for electrically coupling with the neutral end of one or more windings. As illustrated, the first and second sets of legs can extend in different directions from one another such that the neutral slots 114A-114C of the first set of legs 112A-112C are positioned along an inner circumference and the neutral slots 114D-114F of the second set of legs 112D-112F are positioned along an outer circumference. As discussed in more detail below, the inner circumference can correspond to an inner layer of stator slots and the outer circumference can correspond to an outer layer of the stator slots adjacent to the stator backiron.

The first phase lead bus bar 120 can have a planar branch 127 with a first leg 122A and a second leg 122B leg extending from the planar branch 127. Each leg 122A, 122B can have a slot 124A, 124B at a phase lead terminal end 123A, 123B thereof for electrically coupling with the phase lead end of one or more stator windings. The two legs 122A, 122B can extend in different directions from one another such that the first phase lead slot 124A along an inner circumference, for example above a winding layer along the inner diameter of the stator, and the second phase lead slot 124B is positioned along an outer circumference, for example above the outer layer of the stator slot adjacent to the stator backiron. The legs 122A, 122B can be connected to the planar branch 127 via a bridge 121A, 121B that can include a bend or compound bend, such that the leg 122A, 122B extends at an angle and/or lies within a different plane than the planar branch 127.

The second phase lead bus bar 130 can have a planar branch 137 with a first leg 132A and a second leg 132B leg extending from the planar branch 137. Each leg 132A, 132B can have a slot 134A, 134B at a phase lead terminal end 133A, 133B thereof for electrically coupling with the phase lead end of one or more stator windings. The two legs 132A, 132B can extend in different directions from one another such that the first phase lead slot 134A along an inner circumference, for example above a winding layer along the inner diameter of the stator, and the second phase lead slot 134B is positioned along an outer circumference, for example above the outer layer of the stator slot adjacent to the stator backiron. The legs 132A, 132B can be connected to the planar branch 137 via a bridge 131A, 131B that can include a bend or compound bend, such that the leg 132A, 132B extends at an angle and/or lies within a different plane than the planar branch 137.

The third phase lead bus bar 140 can have a planar branch 147 with a first leg 142A and a second leg 142B leg extending from the planar branch 147. Each leg 142A, 142B can have a slot 144A, 144B at a phase lead terminal end 143A, 143B thereof for electrically coupling with the phase lead end of one or more stator windings. The two legs 142A, 142B can extend in different directions from one another such that the first phase lead slot 144A along an inner circumference, for example above a winding layer along the inner diameter of the stator, and the second phase lead slot 144B is positioned along an outer circumference, for example above the outer layer of the stator slot adjacent to the stator backiron. The legs 142A, 142B can be connected to the planar branch 147 via a bridge 141A, 141B that can include a bend or compound bend, such that the leg 142A, 142B extends at an angle and/or lies within a different plane than the planar branch 147.

The shapes of the planar branches, bridges, and legs of the phase lead bus bars 120, 130, 140 and neutral bus bar 110 can be selected so that the bus bars form a compact nested configuration without touching one another, as contact between the bus bars can short an electric motor. Further, the shapes of the planar branches, bridges, and legs of the phase lead bus bars 120, 130, 140 and neutral bus bar 110 can be selected so that the slots are positioned to receive respective conductors according to the winding pattern of the stator. The perspective views of FIGS. 1A and 1B illustrate how the planar branches 127, 137, 147 of the first, second, and third phase lead bus bars 120, 130, 140 and the first branch 117A of the neutral bus bar 110 overlap from a top-down perspective orthogonal to the plane of the branches but are spaced apart from a side perspective orthogonal to the top down-perspective.

Overview of Example Stator and Windings

Figure 2A:
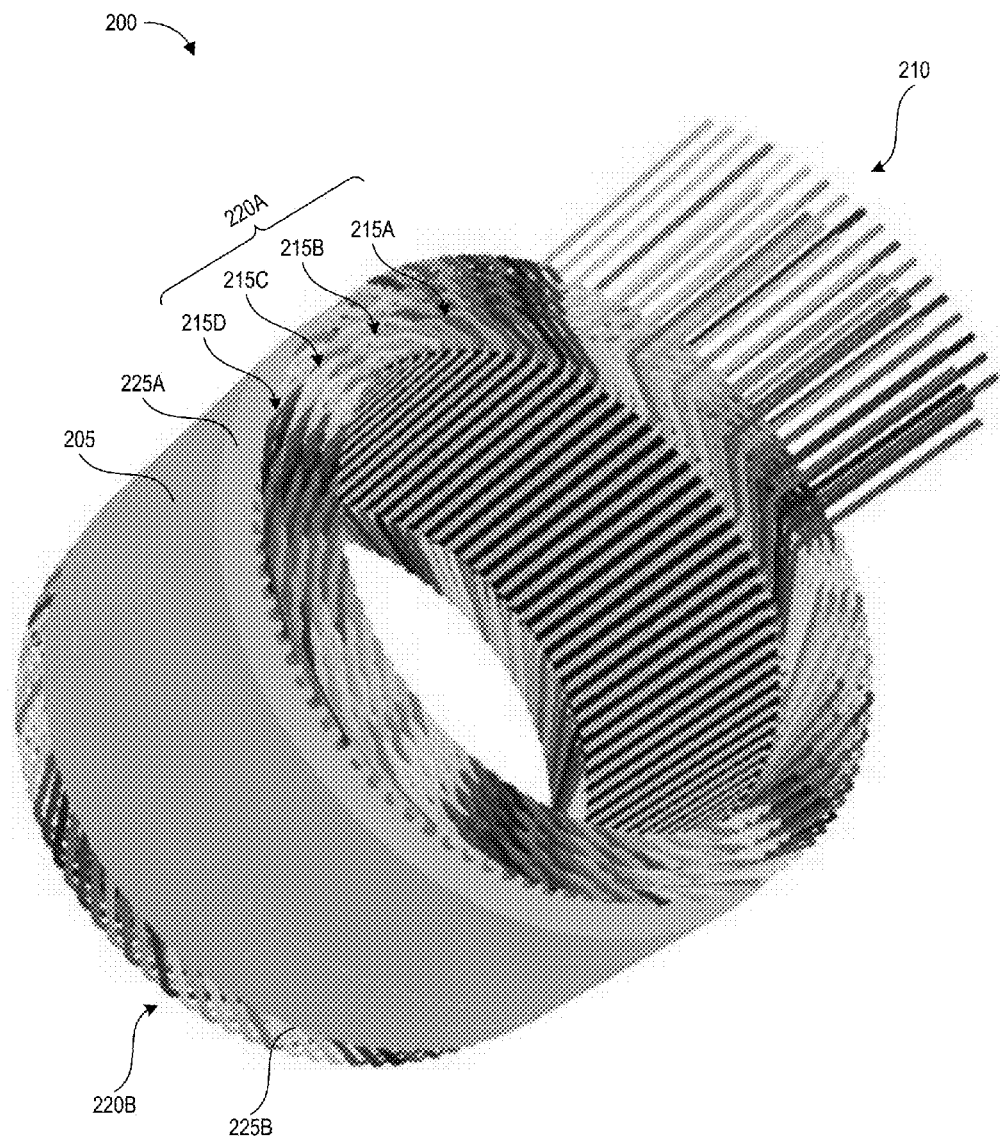
FIG. 2A illustrates a perspective view of an example stator and winding configured according to the disclosed design.
Figure 2B:
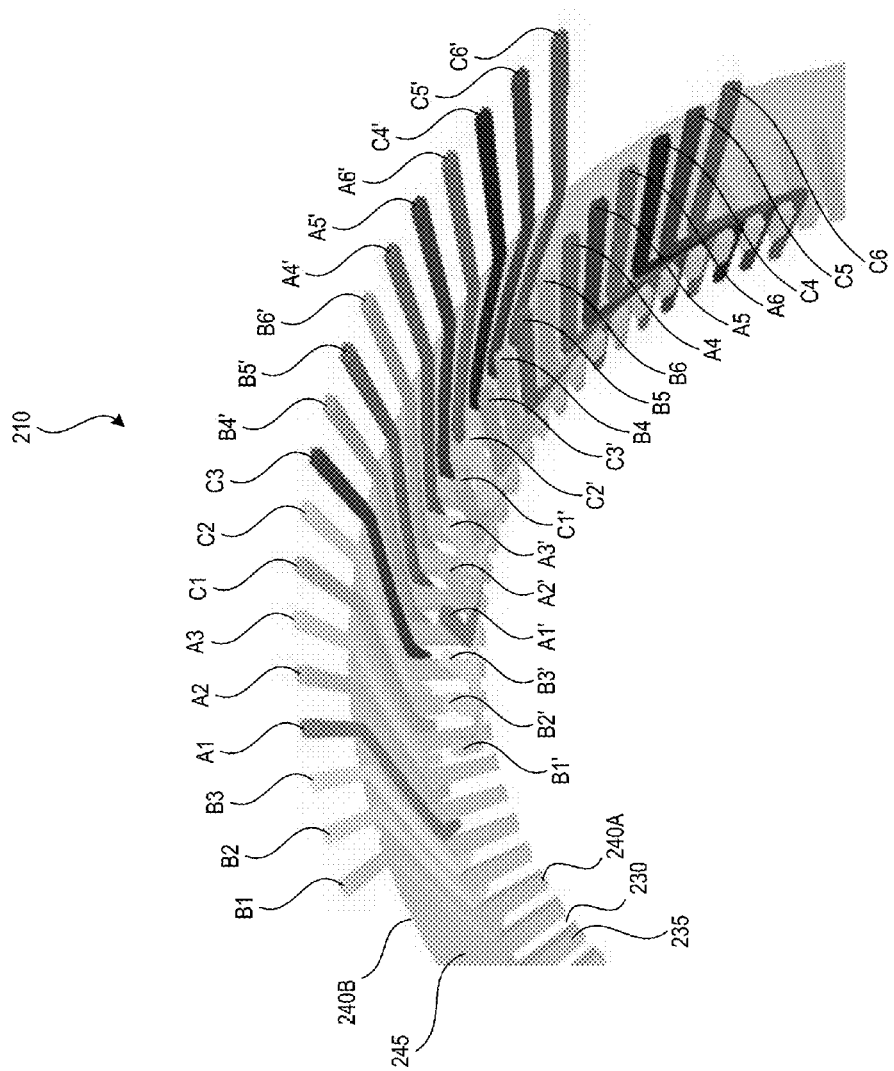
FIG. 2B illustrates, for each of the conductors of the winding of FIG. 2A, the phase lead entering the stator through a first face and the phase neutral exiting the stator through the first face.
Figure 2C:
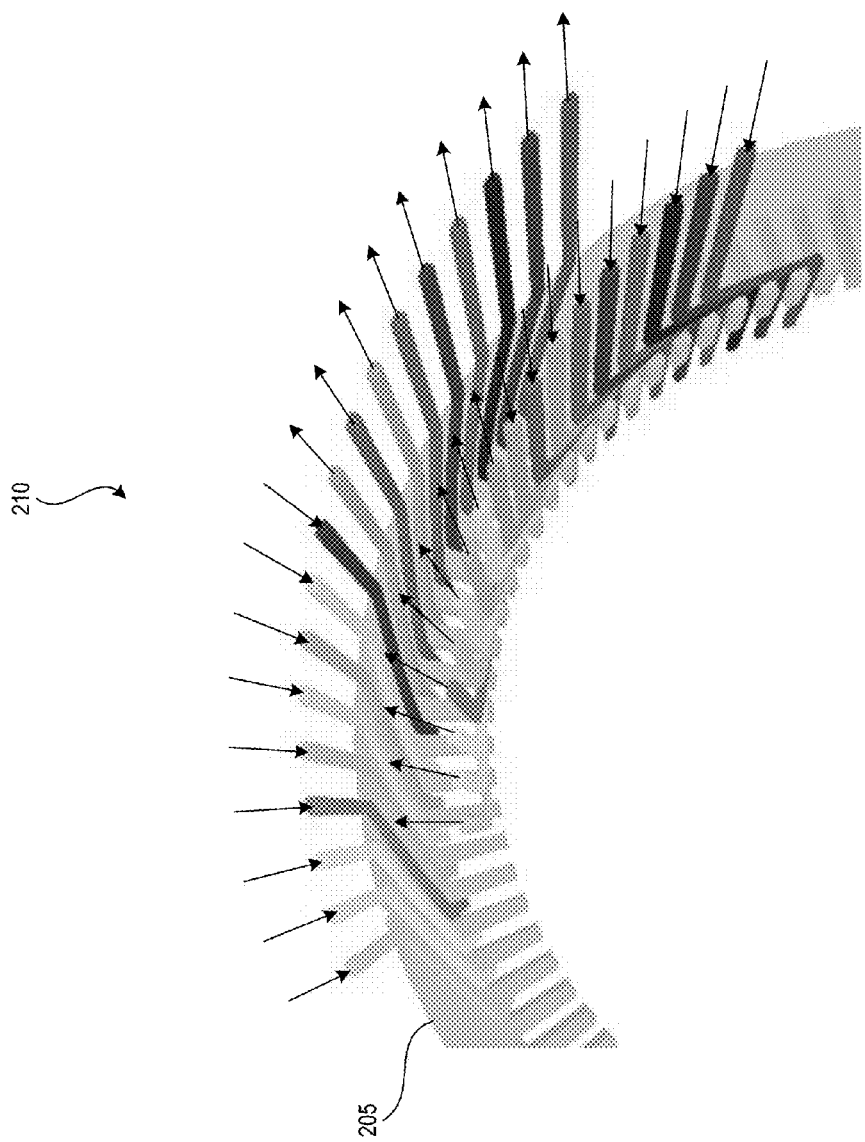
FIG. 2C illustrates an example current flow direction for the phase lead and phase neutral of each of the conductors of the winding of FIG. 2A.

FIG. 2A illustrates a perspective view 200 of an example stator 205 and windings 210 configured according to the disclosed design. FIG. 2B illustrates, for each of the conductors of the winding 210 of FIG. 2A, the phase lead entering the stator through a first face 225A and the phase neutral exiting the stator through the first face 225A. FIG. 2C illustrates an example current flow direction for the phase lead and phase neutral of each of the conductors of the winding of FIG. 2A. FIGS. 2A-2C are described together below.

The stator 205 can be of generally cylindrical form having a first end face 225A and a second end face 225B, an inner diameter 240A and an outer diameter 240B, a backiron 245 extending from the outer diameter 240B to the base of a number of teeth 235, and teeth 235 extending from the backiron 245 to the inner diameter 240A. The teeth 235 can be separated by a number of slots 230 and the conductive windings 210 can be positioned within the slots 230. In some embodiments of the electric motor, the windings 210 can be continuous windings inserted into the stator slots 230 in a predetermined winding configuration such that each winding has a phase lead (input) end and a neutral (output) end extending above one of the end faces 225A of the stator, as shown in FIG. 2B.

A continuous winding can include a number of generally straight leg portions for positioning within the stator slots 230 and a number of crowns 215A-215D formed in the winding connecting successive leg portions. The crowns 215A-215D can include a bend or a compound bend at an apex of the crown and successive crowns in a winding can extend alternately above the first and second end faces of the stator. The illustrated winding includes eight layers and four circular rows of crowns, where the adjacent winding crowns nest with one another to form a compact winding arrangement of two sets of nested crowns 220A, 220B above the first and second end faces 225A, 225B of the stator. In the illustrated example, the winding pattern includes 18 conductors fed in parallel with six conductors per each of the three phases.

FIG. 2B illustrates the winding pattern, showing only the phase lead ends of the 18 conductors entering the stator 205 and neutral ends of each of the 18 conductors exiting the stator 205. FIG. 2C shows the direction of the current flowing into the conductors at the phase lead ends and flowing out of the conductors at the neutral ends. For purposes of illustration, the rest of each of the conductors is not shown in FIGS. 2B and 2C, however in the example winding each conductor winds around the circumference of the stator four times, forming a nested configuration of four circular rows of crowns while having eight layers of conductors in each stator slot. The phase leads ends of the conductors are denoted by A1-A6, B1-B6, and C1-C6, which denote the phase lead ends of each of the six conductors for carrying current phases A, B, and C. The neutral ends of the conductors are denoted by A1'-A6', B1'-B6', and C1'-C6', which are the opposite ends of respective conductors A1-A6, B1-B6, and C1-C6.

In the illustrated winding pattern, the phase lead ends of a first subset of the conductors A4-A6, B4-B6, and C4-C6 are positioned in an inner layer of the stator slots and the neutral ends of those conductors A4'-A6', B4'-B6', and C4'-C6' are positioned in an outer layer of the stator slots. The phase lead ends of a second subset of the conductors A1-A3, B1-B3, and C1-C3 are positioned in the outer layer of the stator slots and the neutral ends of those conductors A1'-A3', B1'-B3', and C1'-C3' are positioned in the inner layer of the stator slots. Each conductor can wind around the circumference of the stator a number of times between the phase lead end and the neutral end. Each time the conductor winds around the circumference of the stator it can alternate between positions in two adjacent slot layers due to the bend in the crown, and after winding around the circumference can switch to alternating between an additional two adjacent slots until reaching its phase neutral end at the inner or outer layer of the stator.

As illustrated, the first subset of the conductors A4-A6, B4-B6, and C4-C6 can enter the stator through the face 225A and wind around the circumference in a clockwise direction when viewed orthogonally to the face 225A. The second subset of the conductors A1-A3, B1-B3, and C1-C3 can enter the stator through the face 225A and wind around the circumference in a counter-clockwise direction when viewed orthogonally to the face 225A. Corresponding conductors in the first and second subsets can form a pair that alternate between the layers of the same stator slots together. For example, in the A phase conductors A1 and A4 can form a pair, conductors A2 and A5 can form a pair, and conductors A3 and A6 can form a pair. In the B phase conductors B1 and B4 can form a pair, conductors B2 and B5 can form a pair, and conductors B3 and B6 can form a pair. In the C phase conductors C1 and C4 can form a pair, conductors C2 and C5 can form a pair, and conductors C3 and C6 can form a pair. Accordingly, each stator slot can have only a single phase of conductors with current flowing in opposite directions through the slot in adjacent layers. Due to the pairing of the conductors and the layer alternation, the winding pattern forms four circular rows of crowns while filling eight layers of stator slots. The illustrated winding pattern has three adjacent slots with B phase conductors with the next three adjacent slots having A phase conductors and the next three adjacent slots having C phase conductors, with this pattern repeating all the way around the circumference of the stator. In other embodiments the stator design or winding pattern can have different numbers of circular rows and a corresponding double number of conductors in each stator slot, and can have a different pattern of phase positioning around the stator circumference.

Figure 3:
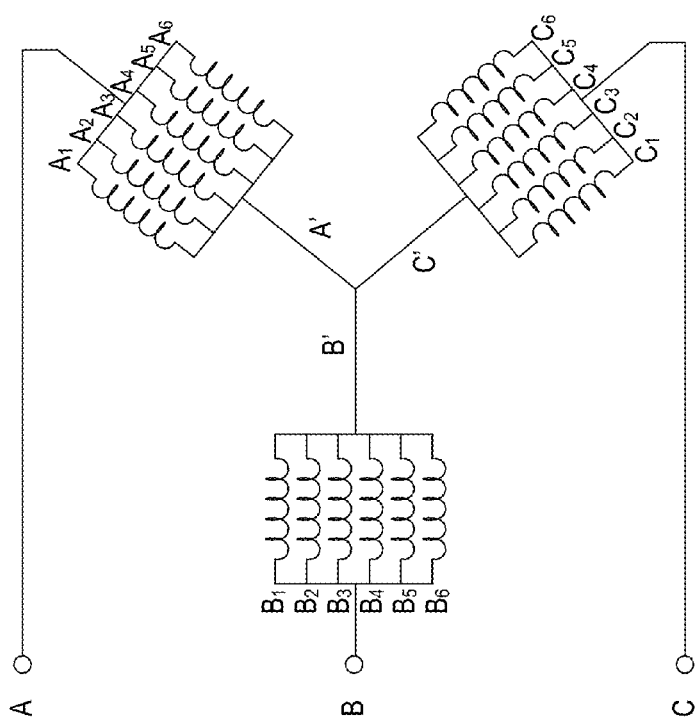
FIG. 3 illustrates a high-level schematic view of an example three-phase, 18 conductor stator winding.

FIG. 3 illustrates a high-level schematic view of an example three-phase, 18 conductor stator winding. Each of three phases A, B, and C have six conductors A1-A6, B1-B6, and C1-C6 connected in parallel. The phase leads A, B, and C can be connected to electrical leads from a three-phase inverter in some examples. Each conductor is also connected to a phase neutral end A', B', C' and these phase neutral ends are connected to one another.

Overview of Example Coupled Bus Bar Unit and Windings

Figure 4A:
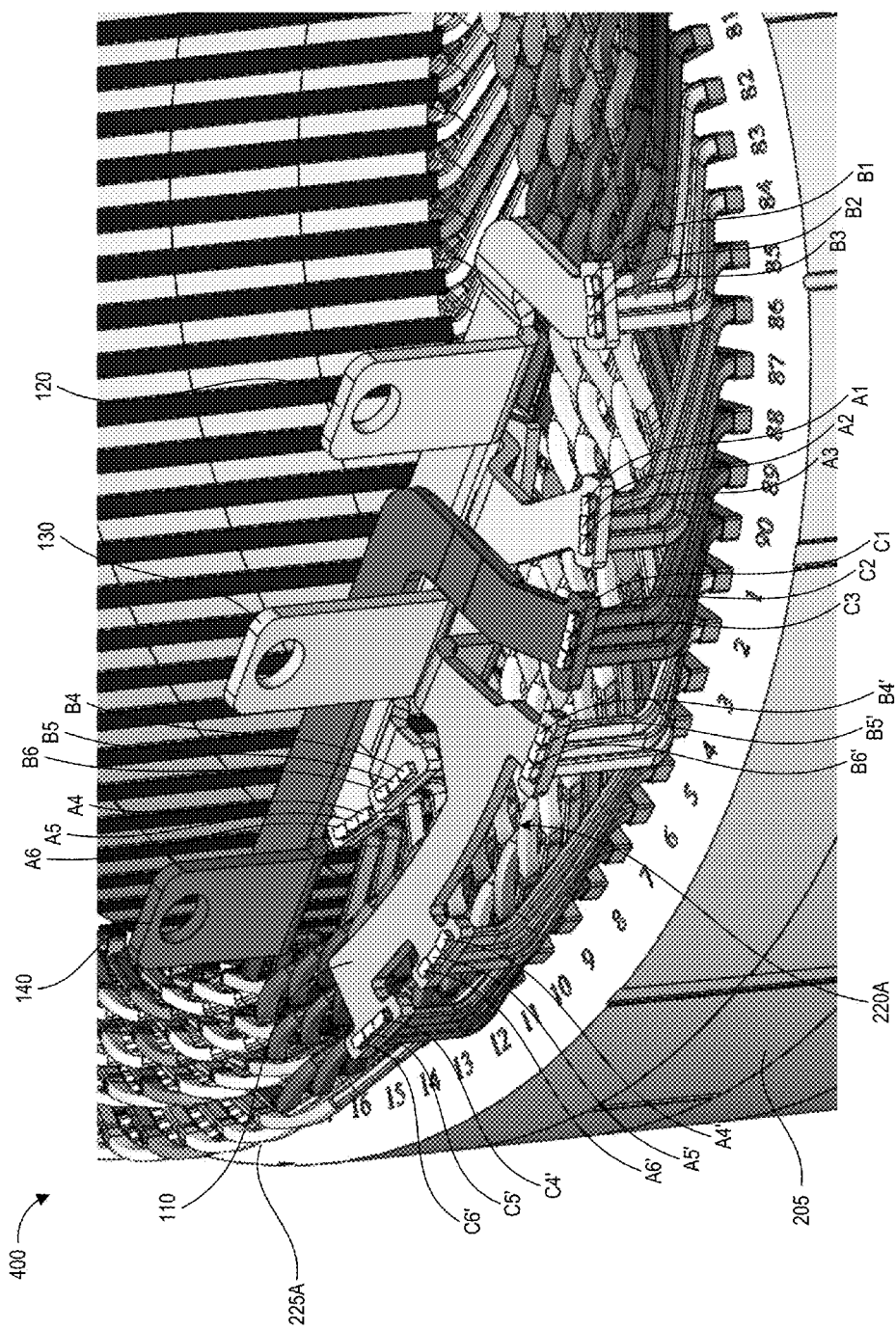
FIGS. 4A and 4B illustrate various perspective views of the conductors of the stator of FIGS. 2A-2C coupled with the example nested bus bar arrangement of FIGS. 1A-1B.
Figure 4B:
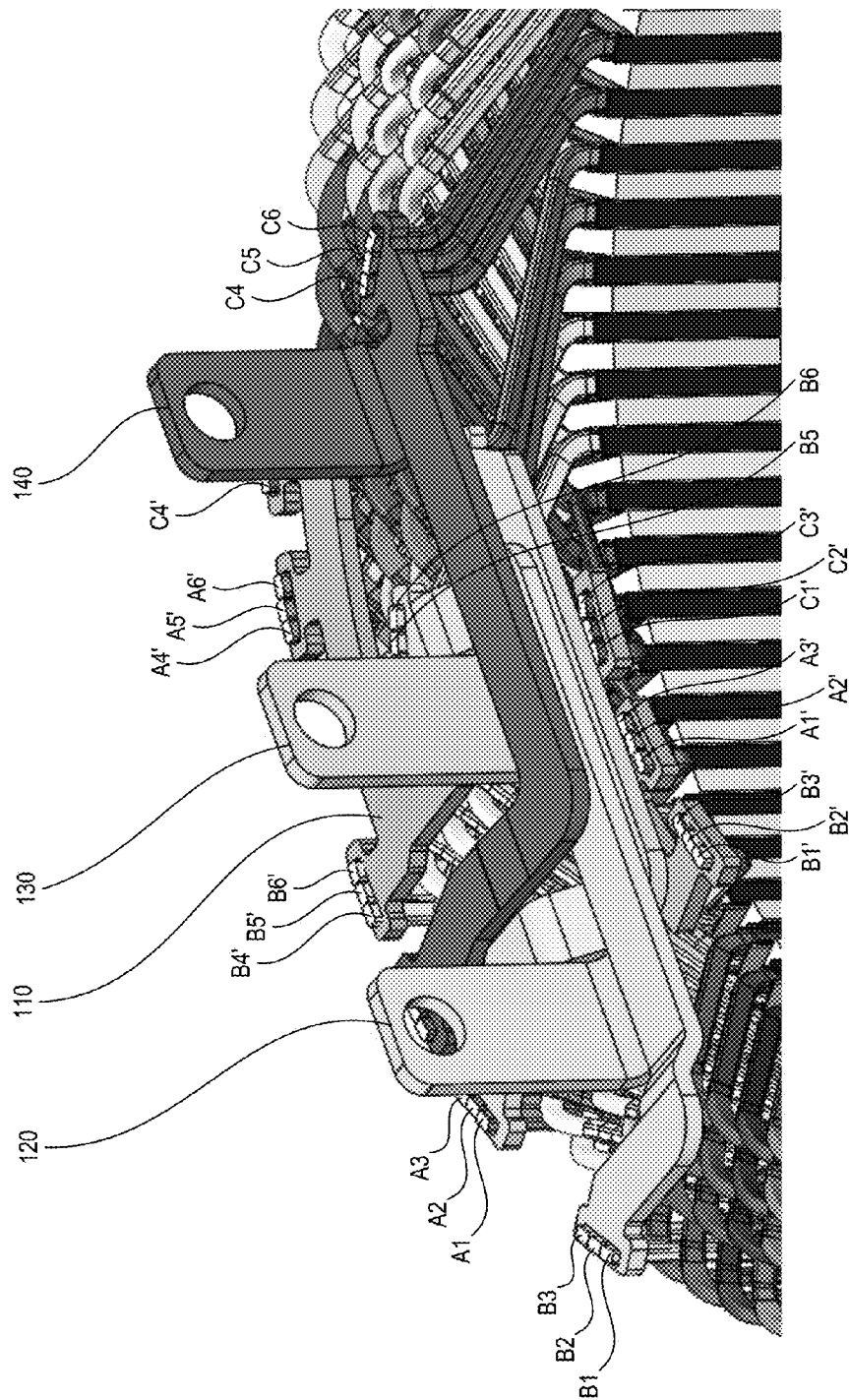

FIGS. 4A and 4B illustrate various perspective views of the conductors of the stator 205 of FIGS. 2A-2C coupled with the example nested bus bar unit 100 of FIGS. 1A-1B. As illustrated, the first slot 124A of the first phase lead conductor 120 holds the phase lead ends of conductors B4-B6 above the inner layer of the stator slots and the second slot 124 holds the phase lead ends of conductors B1-B3 above the outer layer of the stator slots. The first slot 134A of the second phase lead conductor 130 holds the phase lead ends of conductors A4-A6 above the inner layer of the stator slots and the second slot 134 holds the phase lead ends of conductors A1-A3 above the outer layer of the stator slots. The first slot 144A of the third phase lead conductor 140 holds the phase lead ends of conductors C4-C6 above the inner layer of the stator slots and the second slot 144 holds the phase lead ends of conductors C1-C3 above the outer layer of the stator slots. The first slot 114A of the neutral bus bar 110 holds the phase neutral ends B1'-B3' of conductors B1-B3, the second slot 114B of the neutral bus bar 110 holds the phase neutral ends A1'-A3' of conductors A1-A3, the third slot 114C of the neutral bus bar 110 holds the phase neutral ends C1'-C3' of conductors C1-C3, the fourth slot 114D of the neutral bus bar 110 holds the phase neutral ends B4'-B6' of conductors B4-B6, the fifth slot 114E of the neutral bus bar 110 holds the phase neutral ends A4'-A6' of conductors A4-A6, and the sixth slot 114C of the neutral bus bar 110 holds the phase neutral ends C4'-C6' of conductors C4-C6.

The positioning of the various slots of the bus bar unit can reduce errors during insertion of the windings into their respective slots. For example, the slot sizes and positions can correspond to the locations of the phase lead ends and neutral ends of the conductors so that inserting the ends of the conductors into the correct slots simply follows the geometry of the bus bar unit 100. Once in place the ends of the conductors can be welded to the material of the terminal ends surrounding the slots.

Figure 5A:
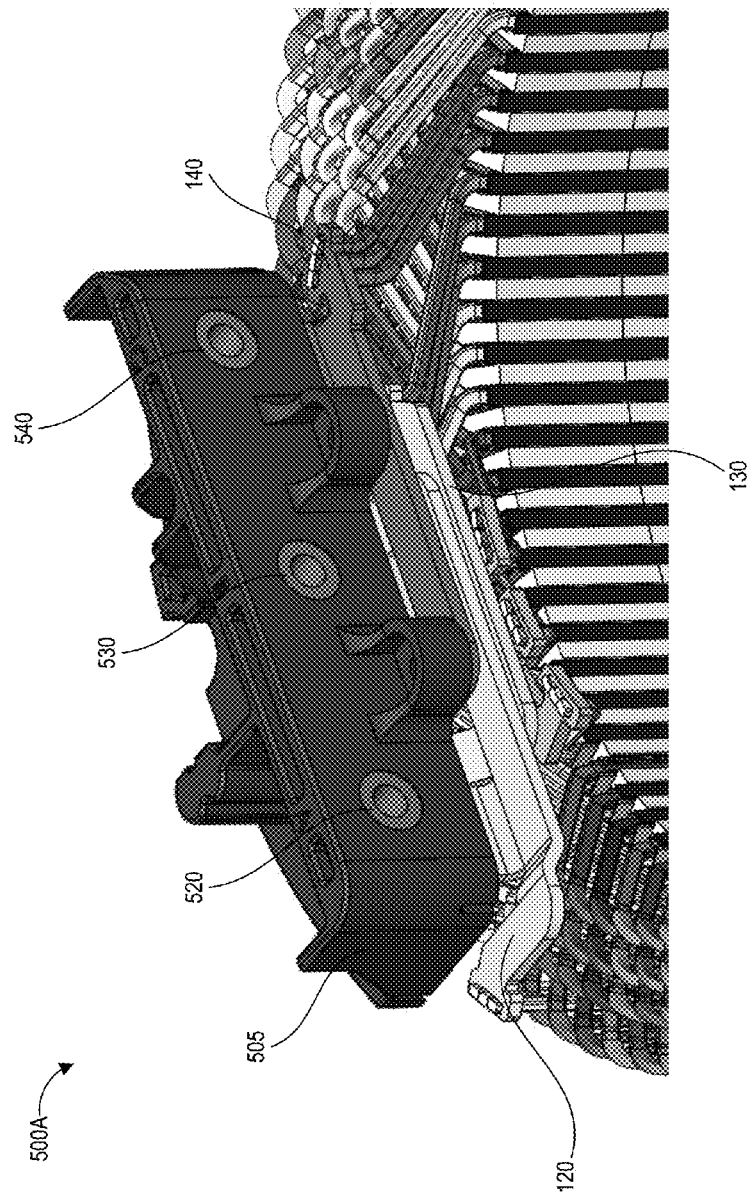
FIG. 5A illustrates an example housing of the example nested bus bar arrangement of FIGS. 1A-1B.
Figure 5B:
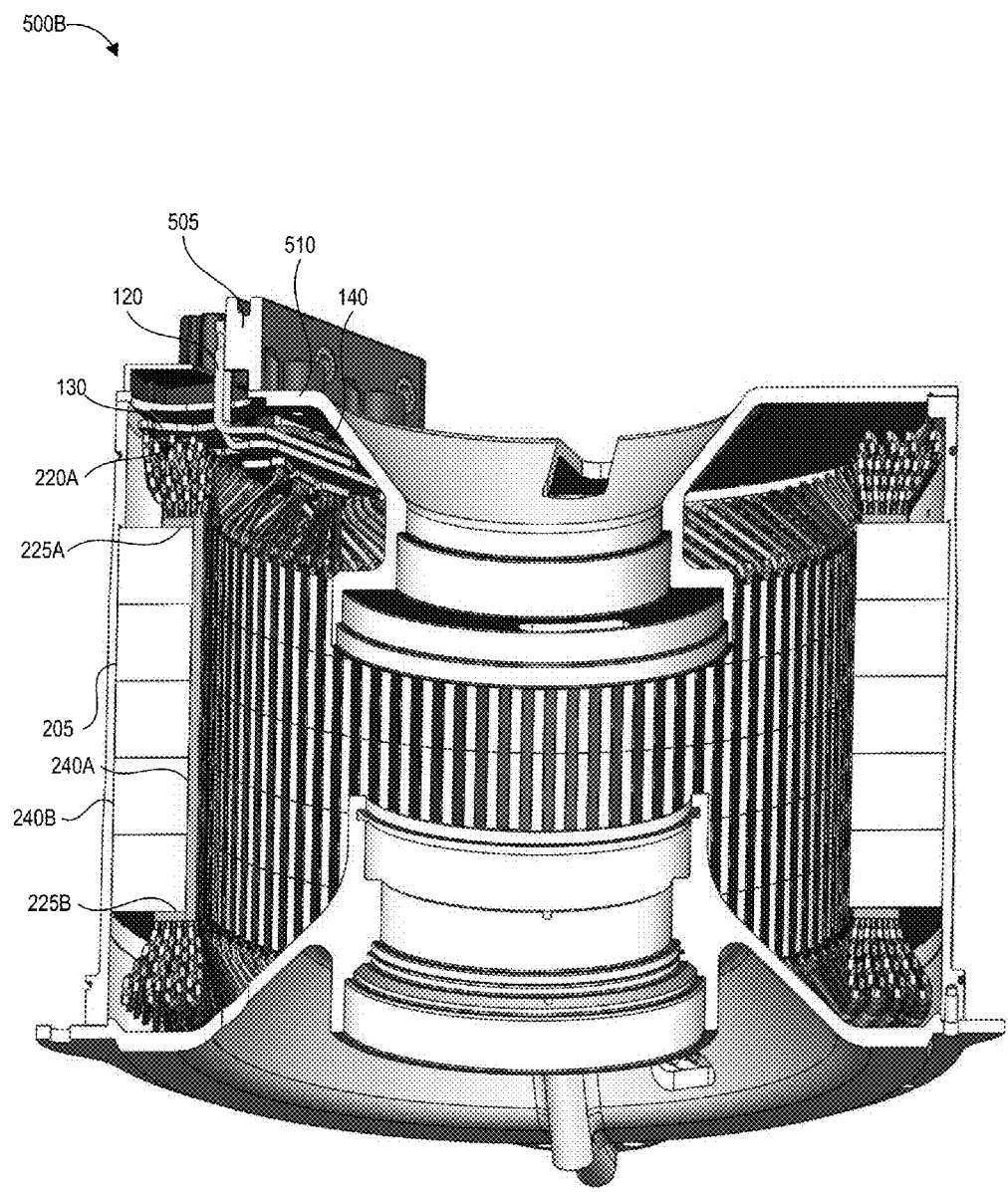
FIG. 5B illustrates the housing of FIG. 5A and the stator of FIGS. 2A-2C within a motor enclosure.

FIG. 5A illustrates a perspective view 500A of an example housing 505 of the example nested bus bar arrangement 100 of FIGS. 1A-1B positioned on the stator windings. FIG. 5B illustrates a cut-away view 505B the housing of FIG. 5A and the stator of FIGS. 2A-2C within a motor enclosure 510. The housing 505 can serve to electrically insulate the connection terminals 125, 125, 145 of the phase lead bus bars 120, 130, 140 from the enclosure 510 as well as providing mechanical support for the phase lead bus bars 120, 130, 140 at the point of the connection terminals 125, 125, 145. The housing 505 can include apertures 520, 530, 540 for allowing electric leads to pass through to the connection terminals 125, 125, 145, for example three leads from a three-phase inverter.

As shown in FIG. 5B, the housing 505 can be coupled to the motor enclosure 510 with the apertures 520, 530, 540 positioned above an upper surface of the enclosure 510 and the planar branches positioned between the apexes of winding crowns 220A and an interior surface of the enclosure 510. The compact nesting arrangement of the bus bars allows them to be positioned within the enclosure 510.

Overview of Example Drive Systems Implementing Electric Motors

Figure 6:
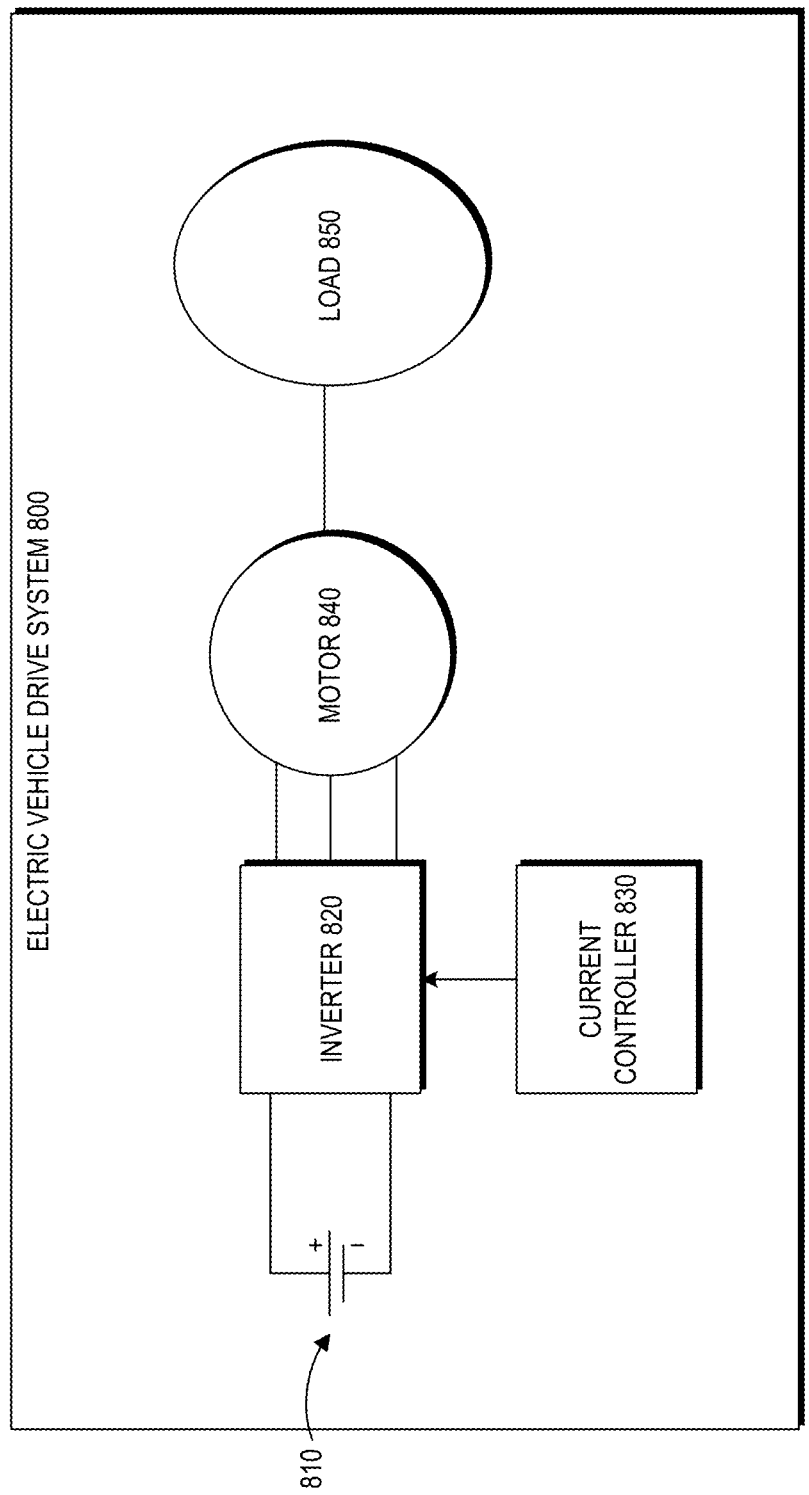
FIG. 6 illustrates a block diagram of an example electric vehicle drive system including an motor as described herein.

FIG. 6 depicts a block diagram of an example electric vehicle drive system 800 including a motor 840 as described herein. The electric vehicle drive system 800 includes a voltage source 810, inverter 820 coupled to the voltage source, current controller 830, motor 840, and load 850. The inverter 820 can be coupled to the motor 840 by a bus bar unit as disclosed herein.

The voltage source 810 is typically a single phase direct current (DC) source; however, single and multi-phase alternating current (AC) outputs are also possible. In some embodiments, voltage source 810 represents a rechargeable electric vehicle battery or traction battery used to power the propulsion of an electric vehicle including the drive system 800.

Inverter 820 includes power inputs which are connected to conductors of the voltage source 810 to receive one of DC power, single-phase electrical current or multi-phase electrical current. Additionally, the inverter 820 includes an input which is coupled to an output of current controller 830, described further below. The inverter 820 also includes three outputs representing three phases with currents that can be separated by 120 electrical degrees, with each phase provided on a conductor coupled to the motor 840, for example via a bus bar as described herein. It should be noted that in other embodiments inverter 820 may produce greater or fewer than three phases, and the number of phase lead bus bars in the bus bar unit can be modified accordingly.

The motor 840 is fed from voltage source inverter 820 controlled by current controller 830. The bus bar phase inputs of motor 840 are coupled to respective windings distributed about a stator. The motor 840 can be coupled to a mechanical output, for example a mechanical coupling between the motor 840 and mechanical load 850. Mechanical load 850 may represent one or more wheels of the electric vehicle.

Controller 830 can be used to generate gate signals for the inverter 820. Accordingly, control of vehicle speed is performed by regulating the voltage or the flow of current from the inverter 820 through the stator of the motor 840. There are many control schemes that can be used in the electric vehicle drive system 800 including current control, voltage control, and direct torque control. Selection of the characteristics of inverter 820 and selection of the control technique of the controller 830 can determine efficacy of the drive system 800.

Although not illustrated, the electric vehicle drive system 800 can include one or more position sensors for determining position of the rotor of motor 840 and providing this information to the controller 830. For example, the motor 840 can include a signal output that can transmit a position of a rotor assembly of the motor 840 with respect to the stator assembly motor 840. The position sensor can be, for example, a hall-effect sensor, potentiometer, linear variable differential transformer, optical encoder, or position resolver. The saliency exhibited by motor 840 can also allow for sensorless control applications. The saliency signature of motor 840 can be strong enough that it can be used to determine rotor position at standstill and low speed operating conditions. Some sensorless designs can use saliency mapping at low speeds and then transition to a back-EMF observer model as the motor 840 speeds up.

Although not illustrated, the electric vehicle drive system 800 can include one or more current sensors for determining phase currents of the phase lead bus bars and/or stator windings and providing this information to the controller 830. The current sensor can be, for example, a hall-effect current sensor, a sense resistor connected to an amplifier, or a current clamp.

It should be appreciated that while the motor 840 is depicted as an electrical machine that can receive electrical power to produce mechanical power, it can also be used such that it receives mechanical power and thereby converts that to electrical power. In such a configuration, the inverter 820 can be utilized to excite the winding using a proper control and thereafter extract electrical power from the motor 840 while motor 840 is receiving mechanical power.

Implementing Systems and Terminology

Implementations disclosed herein provide design for a bus bar unit providing phase leads and neutral leads for the windings of an electric motor.

The systems and methods above have been described in general terms as an aid to understanding details of preferred embodiments of the present invention. Other preferred embodiments of the present include the described application for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A three-phase electric machine comprising:
  a stator having a plurality of teeth separated by a plurality of slots;
  a plurality of windings provided in a winding pattern in the plurality of slots, each of the plurality of windings having a phase lead end and a neutral end extending beyond an end face of the stator; and
  a bus bar unit positioned adjacent to the end face of the stator to receive the phase lead end and the neutral end of each of the plurality of windings, the bus bar unit comprising:
    first, second, and third phase lead bus bars, wherein each of the first, second, and third phase lead bus bars comprises:
      a planar branch,
      at least a first leg extending from the planar branch, the first leg having a first phase lead slot sized to receive the phase lead end of at least one of the plurality of windings, and
      a connection terminal extending from the planar branch for receiving one of three phases of electric current; and
    an enclosure enclosing the stator, the plurality of windings, and the branches and legs of the bus bar unit;
  wherein the winding pattern includes a plurality of layers in each of the plurality of slots with an inner layer positioned adjacent an inner diameter of the stator and an outer layer positioned adjacent a backiron of the stator;
  the phase lead end of each a first subset of the plurality of windings extends above the end face of the stator from the inner layer;
  the neutral end of each of the first subset of the plurality of windings extends above the end face of the stator from the outer layer;
  the phase lead end of each a second subset of the plurality of windings extends above the end face of the stator from the outer layer; and
  the neutral end of each of the second subset of the plurality of windings extends above the end face of the stator from the inner layer.

2. The three-phase electric machine of claim 1, further comprising a neutral bus bar;
  wherein:
    the neutral bus bar comprises a first set of at least three legs and a second set of at least three legs, each of the first set of legs having a first neutral slot and each of the second set of legs having a second neutral slot;
    each of the first, second, and third phase led bus bars further comprises a second leg, each of the second legs having a second phase lead slot;
    the first phase lead slot of each of the first, second, and third phase lead bus bars is positioned to receive the phase lead end of at least one of the first subset of the plurality of windings;
    the first neutral slot of each of the first set of legs of the neutral bus bar is positioned to receive the neutral end of at least one of the second subset of the plurality of windings;
    the second phase lead slot of each of the first, second, and third phase lead bus bars is positioned to receive the phase lead end of at least one of the second subset of the plurality of windings; and the second neutral slot of each of the second set of legs of the neutral bus bar is positioned to receive the neutral end of at least one of the first subset of the plurality of windings.

3. A three-phase electric machine comprising:

a stator having a plurality of teeth separated by a plurality of slots;

a plurality of windings provided in a winding pattern in the plurality of slots, each of the plurality of windings having a phase lead end and a neutral end extending beyond an end face of the stator; and a bus bar unit positioned adjacent to the end face of the stator to receive the phase lead end and the neutral end of each of the plurality of windings, the bus bar unit comprising first, second, and third phase lead bus bars and a neutral bus bar;

wherein each of the first, second, and third phase lead bus bars comprises:

a planar branch, a first leg extending from the first planar branch, the first leg having a first phase lead slot sized to receive the phase lead end of at least one of the plurality of windings, a second leg extending from the planar branch, the second leg having a second phase lead slot sized to receive the phase lead end of at least one of the plurality of windings, and a connection terminal extending from the first planar branch for receiving one of three phases of electric current;

wherein the neutral bus bar comprises:

a first planar branch of the neutral bus bar and a first set of at least three legs extending from the first planar branch of the neutral bus bar, each of the first set of legs having a first neutral slot sized to receive the neutral end of at least one of the plurality of windings, and a second planar branch of the neutral bus bar and a second set of at least three legs extending from the second planar branch of the neutral bus bar, each of the second set of legs having a second neutral slot sized to receive the neutral end of at least one of the plurality of windings;

wherein the first phase lead slots of each of the first, second, and third phase lead bus bars and the first neutral slots of the neutral bus bar are positioned along an inner circumference of the stator, wherein the second phase lead slots of each of the first, second, and third phase lead bus bars and the second neutral slots of the neutral bus bar are positioned along an outer circumference of the stator, wherein the inner and outer circumferences are concentric with one another with the inner circumference having a smaller diameter than the outer circumference; and an enclosure enclosing the stator, the plurality of windings, and the branches and legs of the bus bar unit.

4. The three-phase electric machine of claim 3, wherein the first, second, and third phase lead bus bars are positioned in a stack such that:

from a top-down perspective orthogonal to the end face of the stator, the planar branches of each of the first, second, and third phase lead bus bars overlap at least partially with one another; and from a side perspective orthogonal to the top-down perspective, the planar branches of each of the first, second, and third phase lead bus bars are spaced apart from one another.

5. The three-phase electric machine of claim 3, wherein each of the plurality of windings is a continuous winding comprising a plurality of leg portions each positioned in one of the plurality of slots of the stator and a plurality of crowns connecting successive leg portions of the plurality of leg portions, the crowns extending above the end face of the stator.

6. The three-phase electric machine of claim 5, wherein the bus bar unit is positioned between a peak of each of the plurality of crowns and an inner surface of the enclosure.

7. The three-phase electric machine of claim 3, wherein the connection terminal of each of the first, second, and third phase lead bus bars is mechanically coupled to the enclosure.

8. The three-phase electric machine of claim 3, wherein the phase lead ends of a first subset of the plurality of windings are electrically coupled to the respective first phase lead slots to receive respective phases of the three phases of electric current, and wherein the phase lead ends of a second subset of the plurality of windings are electrically coupled to the respective second phase lead slots to receive respective phases of the three phases of electric current.

9. The three-phase electric machine of claim 8, wherein the first and second neutral slots of neutral bus bar electrically couple the neutral ends of the plurality of windings with one another.

* * * * *